United States Patent [19]

Schweitzer

[11] Patent Number: 5,094,804
[45] Date of Patent: Mar. 10, 1992

[54] NUCLEAR FUEL ELEMENTS AND METHOD OF MAKING SAME

[75] Inventor: Donald G. Schweitzer, Bayport, N.Y.

[73] Assignee: Associated Universities, Inc., Washington, D.C.

[21] Appl. No.: 597,415

[22] Filed: Oct. 15, 1990

[51] Int. Cl.⁵ .............................................. G21C 3/00
[52] U.S. Cl. ................................. 376/414; 376/428; 376/416; 376/417
[58] Field of Search ............... 376/428, 414, 416, 413, 376/417, 418; 156/215; 423/448, 446, 458

[56] References Cited

U.S. PATENT DOCUMENTS

| | | | |
|---|---|---|---|
| 3,856,622 | 12/1974 | Pollock et al. | 376/410 |
| 3,945,629 | 3/1976 | Ragone et al. | 269/0.5 |
| 4,077,838 | 3/1978 | Lindemer et al. | 376/411 |
| 4,681,732 | 7/1987 | Mallener et al. | 376/337 |

Primary Examiner—Donald P. Walsh
Assistant Examiner—Meena Chelliah
Attorney, Agent, or Firm—Margaret C. Bogosian; Vale P. Myles

[57] ABSTRACT

A nuclear fuel element for a high temperature gas nuclear reactor that has an average operating temperature in excess of 2000° C., and a method of making such a fuel element. The fuel element is characterized by having fissionable fuel material localized and stabilized within pores of a carbon or graphite member by melting the fissionable material to cause it to chemically react with the carbon walls of the pores. The fissionable fuel material is further stabilized and localized within the pores of the graphite member by providing one or more coatings of pyrolytic carbon or diamond surrounding the porous graphite member so that each layer defines a successive barrier against migration of the fissionable fuel from the pores, and so that the outermost layer of pyrolytic carbon or diamond forms a barrier between the fissionable material and the moderating gases used in an associated high temperature gas reactor. The method of the invention provides for making such new elements either as generally spherically elements, or as flexible filaments, or as other relatively small-sized fuel elements that are particularly suited for use in high temperature gas reactors.

20 Claims, 4 Drawing Sheets

Fig. 4

NUCLEAR FUEL ELEMENTS AND METHOD OF MAKING SAME

This invention was made with Government support under contract number DE-AC02-76CH00016, between the U.S. Department of Energy and Associated Universities, Inc. The Government has certain rights in the invention.

The invention relates to nuclear fuel element construction and composition, and to a method of manufacture for making fuel elements that are particularly useful in high temperature gas reactors. More particularly, the invention relates to fuel elements that are useful in high temperature reactors in which the normal operating temperature of the reactor is in excess of 2,000 degrees centigrade and exceeds the melting temperature of fissionable material that is localized and stabilized within the reactor fuel elements by a combination of capillary and surface tension forces that result from the unique structure and composition of the elements.

In recent years attempts have been made to design small nuclear power reactors that can be used as the source of driving power on space ships or other vehicles that impose stringent space and weight limitations on the reactor design. In such designs, it has been proposed that particle bed reactors be used, in which relatively small diameter fuel particles in the range of 500 microns in diameter are provided to supply high power densities within the reactor. It has also been proposed that the fuel charge in such reactors be changed or reloaded on a relatively short-cycle basis. For example, such reloading could occur every several hours or perhaps once per day.

The normal sustained operating temperature of the moderating gas in such prior art high temperature gas reactors is in a range that does not exceed about 1,000 degrees centigrade and is not in excess of the melting point temperature of the nuclear fuel compositions used in the fuel elements for the reactors. In order to prevent the nuclear fuels from being diffused or evaporated from the reactor prematurely, that is before the fuels serve their intended function of transmitting a major proportion of their power content to the hot gases within the reactor, it has been necessary to design the fuel elements with a multi-layered structure that enables its outer layers to prevent premature diffusion of the fissionable material from the fuel elements into the reactor moderating gases.

So far as the inventor knows, prior to the present invention there was not known or available any nuclear fuel element or reactor concept in which nuclear fuels could be used at high temperatures that substantially exceed the melting point temperature of the fissionable materials in such fuels by several hundred degrees. By permitting the use of molten fissionable fuels, the present invention increases the operating temperature and resultant performance of high temperature gas reactors by many hundreds of degrees above the known maximum sustained operating temperatures heretofore achieved by gas moderated reactors.

An example of the type of composite nuclear fuel elements that were developed for use in prior art high temperature gas reactors is shown in U.S. Pat. No. 3,212,989. It describes the use of nuclear fuel elements that include at least two independent sealing zones around a core material for retaining fission products within a sealing jacket. Such prior art nuclear fuel elements and related systems have limitations that are imposed by their inherent graphite reactions, and they have two classes of temperature limitations. First, the outlet gas temperature from the associated reactor is limited to about 1,000 degrees centigrade by their primary circuit metal properties and, second, the maximum fuel temperature is limited by melting, with resultant diffusion or evaporation of the fuel before its power has been used to heat the gases in the reactor. As noted in that prior art patent, the type of "high temperature" reactors contemplated for use with the disclosed, jacketed fuel elements has an operating temperature in the range of 700° C. to about 1,000° C. It should also be noted that in such prior art "high temperature" gas reactors there exists geometry problems that arise from the need to separate the reactor structural components from the nuclear fuel. Such limitations have, prior to the present invention, prevented the development of high temperature gas cooled reactors that have an outlet temperature substantially above 1000° C., and have maximum short-term operating fuel temperatures of only about 2000° C.

In general, the operating temperatures in present day nuclear fuel reactors are limited by the melting points of the nuclear fuels used to power the reactors. The present invention discloses a process that is used to form predetermined microscopically localized liquid nuclear fuel concentrations within a confining graphite or carbon fuel element, in a manner such that the fuels are capable of performing at temperatures up to the sublimation temperatures of the confining graphite or carbon, i.e. is in the range of about 3300° C. The invention also discloses novel structures of a variety of useful nuclear fuel elements that are made to include predetermined and controllable porosity configurations for localizing and confining fissionable nuclear fuel within the fuel elements.

Common causes of failure of known prior art nuclear fuel elements at the elevated operating temperatures of high temperature gas reactors result from either the reaction and decomposition of the carbide coating of the element surrounding the fissionable fuel, or from the migration of molten fuel and fission products through the pores of the surrounding carbon or graphite element into the moderating gases before the fuel has discharged its energy to heat the gases.

SUMMARY OF THE INVENTION

A primary object of the present invention is to provide a nuclear fuel element having a distribution of fissionable material within the pores of a confining graphite or carbon member so that the fissionable material is thermodynamically stable with respect to its migration beyond the pores of the confining graphite or carbon member.

A further object of the invention is to provide a method for making nuclear fuel elements in a commercially feasible manner such that the porosity of carbon or graphite fuel members within such elements is controlled to a predetermined degree, so that fissionable material can be effectively deposited within the pores of the carbon or graphite members, which are then sealed, and the members are heat treated to melt the fissionable materials causing them to react with the carbon walls of the members to increase the fuel localizing and stabilizing porosity of the members.

Yet another object of the invention is to provide a nuclear fuel element having fissionable material confined within pores of a carbon or graphite member in a manner such that when the nuclear fuel is heated to above the melting point of the fissionable material the molten fuel material is held by capillary forces and surface tension forces within the pores of the surrounding graphite or carbon member.

A still further object of the invention is to provide a nuclear fuel element in which a porous graphite or carbon member is impregnated with fissionable material, which is localized within the pores of the member, even after the fissionable material melts during operation of the reactor. Both capillary and surface tension forces hold the molten fuel within the pores and the fuel is also stabilized within the pores by coating the member with one or more layers of pyrolytic carbon or diamond.

Still another object of the invention is to provide nuclear fuel elements in the form of flexible filaments having predetermined and controlled porosity such that fissionable material disposed within the pores of the element is localized therein by capillary and surface tension forces when the fissionable material is melted during its use within a reactor. To assure further localization of the molten fissionable material within the flexible filament fuel elements, one or more layers of pyrolytic carbon or diamond are formed over the exterior surface of the carbon or graphite member to afford additional surface barriers to the migration or diffusion of fissionable material from the pores of the carbon or graphite member.

Additional objects and advantages of the invention will become apparent to those skilled in the art from the description presented herein, considered in conjunction with the accompanying drawings.

In the preferred practice of the method of the invention conventional high temperature gas reactor type carbon or graphite fuel particle members are impregnated with oxidants and subjected to a high temperature reaction to develop a predetermined and controlled degree of porosity within the members. The porous members are then impregnated with a solution of fissionable material, such as uranyl nitrate in a suitable solvent, such as water, methanol, etc., to fill the pores of the members with the solution. The solvent is then removed by heat treatment of the members and further heat treatment at higher temperatures reacts the fissionable material with the graphite of the members thereby to further increase the porosity of the members. Additional fuel impregnations may be made to achieve desired, controllable levels of fuel loading of the porous members. The matrix of carbon or graphite members is then soaked in a solution of sugar or other organics and is again heated, thereby to form a layer of carbon that plugs the pores at the surface of the graphite members. The fuel elements are then heated above the melting point temperature of the fissionable material in order to react the fissionable material with the walls of the pores. The molten fuel is held by capillary and surface tension forces within the pores of the graphite members. In a most preferred embodiment of the invention, additional assurance for localization of the molten fissionable material within the pores of the fuel element is afforded by forming one or more layers of pyrolytic carbon or diamond over the outer surface of the porous graphite members, using conventional fluidized bed or controlled vapor deposition techniques for depositing such layers.

The novel nuclear fuel elements formed by the method of the invention may be made as generally spherically shaped pellets, elongated filaments, or other arbitrary configurations. In one preferred form, the fuel elements are formed as flexible filaments of carbon or graphite material having predetermined and controllable porosity and having fissionable material localized within the pores of the carbon members by the capillary and surface tension forces existing between the surface of the pores and the molten fissionable material, when the molten state is achieved by heating the fuel above its melting temperature. Alternate layers of pyrolytic carbon and/or diamond are deposit on the outer surface of the porous carbon or graphite members to provide further assurance against migration or diffusion of molten fissionable material from the pores of the graphite or carbon members.

DESCRIPTION OF THE PREFERRED EMBODIMENTS

Figure 1:
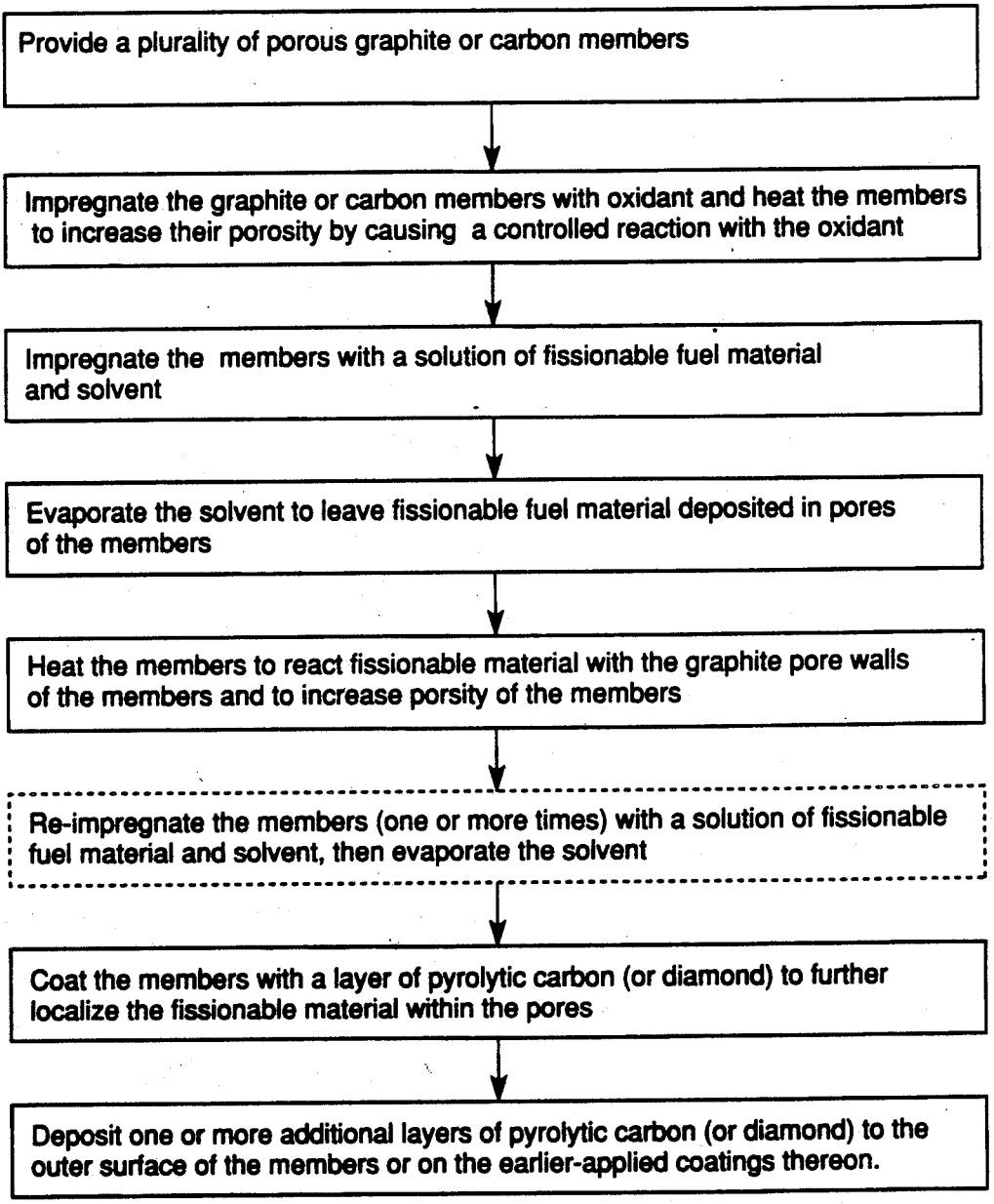
FIG. 1 is a flow chart illustrating preferred steps of the method of the invention.

In describing the preferred embodiments of the invention, reference is first made to FIG. 1 in order to describe the preferred method for making high temperature nuclear fuel elements. Next, the other figures of the drawing are referred to in connection with the disclosure of several preferred high temperature nuclear fuel element structures that are made according to the invention. Nuclear fuel elements made in accordance with the present invention are effective to localize molten fissionable material within the pores of carbon or graphite bodies. In these elements the localized fissionable material is shielded from contact with high temperature moderating gases by providing a coating of diamond or other suitable material over the pores within which the fissionable material is localized. It is recognized that prior art nuclear materials intended for use in gas moderated reactors which characteristically have operating temperatures around 1000° C. or less, have been developed. These known types of porous graphite fuel kernels are used to encapsulated fissionable material such as uranium oxide into so called BISO fuel kernels that are commercially available. It is also understood that such commercially available porous graphite kernels have in some cases been coated with one or more layers of graphite and/or pyrolytic carbon, in order to allow gases generated by fission of the nuclear fuel to be absorbed in the surrounding graphite layers and confined therein against release from the fuel elements. Such prior art fuel elements are not suitable for use in high temperature gas reactors that have a sustained operating temperature in excess of 2000° C., because those elements are not capable of retaining molten fissionable material within the fuel kernel until most of the energy available from the fuel has been transferred to the moderating gases of the reactor. Moreover, such prior art fuel elements do not provide a diamond coating or other suitable means for providing a barrier or shield that protects molten fissionable material within the fuel kernels from contact with the high temperature gases used to moderate the nuclear reaction within such ultra high temperature reactors, i.e. those that operate in excess of 2000° C.

In nuclear fuel elements made according to the present invention, fissionable material is melted within the pores of graphite fuel elements, thereby to cause the fissionable material to chemically react with the walls of the pores in a manner that localizes and stabilizes the fissionable material within the pores. Such fuel elements are also provided with one or more coatings of pyrolytic carbon or diamond, thereby to form barriers that further localize and stabilize the fissionable material within the pores of the fuel element and also serve as barriers that shield the fissionable material from exposure to the high temperature moderating gases present in high temperature gas reactors.

Referring now to FIG. 1 of the drawing, the preferred steps of the method of the invention will be described. In practicing this method one provides a plurality of porous graphite members, such as the commercially manufactured BISO or TRISO nuclear fuel kernels that are readily available. Next, those graphite members are impregnated with a suitable oxidant, such as air or oxygen, and the members are heated to increase their porosity by creating a controlled reaction between the graphite of the members and the oxidant. Next, the graphite members are impregnated with a conventional solution of fissionable fuel material, such as uranyl nitrate and a suitable solvent, such as water. After the members are thus impregnated, the solvent is evaporated to leave the fissionable fuel material deposited within the pores of the members. A next important step of the method of the invention is to heat the graphite members sufficiently to cause the fissionable material to react and then melt with the graphite walls of the pores in the members, thereby to form uranium carbide and to cause the molten fissionable material to be stabilized and localized within the pores of the graphite members.

If desired for given applications, at this point in practicing the method of the invention, one may re-impregnated the graphite members one or more times with a solution of fissionable fuel material and solvent, such as that used for the initial impregnation, then the solvent is evaporated from the graphite members. Another optional step at this point in practicing the method is to again heat the members above the melting point of the fissionable material to cause the fissionable material and the graphite walls of the pores to undergo further chemical reaction, thereby to further localize and stabilize the molten fissionable material within the pores.

Once a desired level of loading of fissionable materials within the pores is thus achieved, the pores are covered with a layer of graphite to seal the fissionable material therein. Finally, the graphite members are coated with a layer of pyrolytic carbon or diamond so that the coating layers provide barriers that further localize the fissionable material within the pores and also provides a barrier between the fissionable material and the hot moderating gases used in high temperature gas reactors. In certain applications of the invention, it is desirable to deposit one or more additional layers of pyrolytic carbon or diamond over the outer surface of the graphite members or over the earlier-applied coating layers thereon, in order to more fully localize the molten fissionable material within the pores of the graphite member, and to better shield the fissionable material from the moderating gases of an associated reactor. The desired layers of pyrolytic carbon or diamond are deposited by using a suitable conventional vapor deposition process that is controlled to make the layers as suitable barriers against migration of molten fissionable material from the pores of the members.

Figure 2:
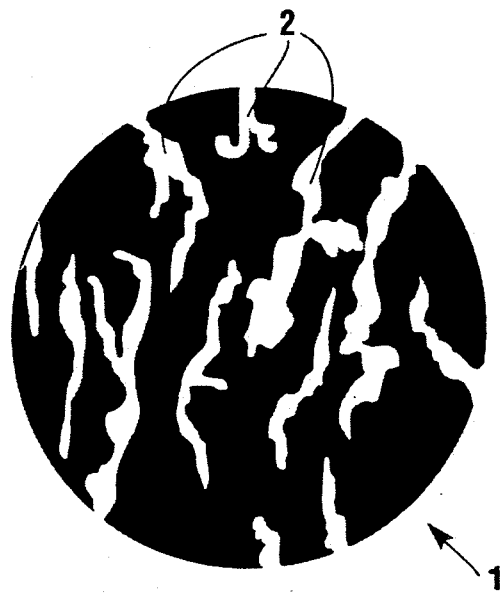
FIG. 2 is a schematic plan view of a cross section of a high temperature, porous nuclear fuel element before it is loaded and heat treated according to the present invention, and illustrating pores within which fissionable material is to be localized and confined within the element by the method of the invention.
Figure 3:
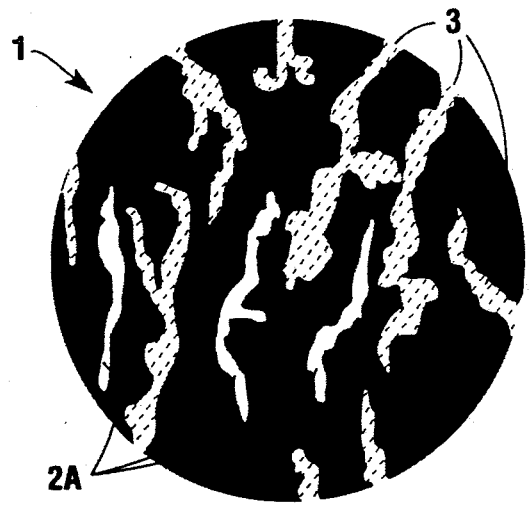
FIG. 3 is a schematic plan view of a nuclear fuel element similar to that illustrated in FIG. 2, but with fissionable nuclear fuel material shown deposited in a majority of the pores within the fuel element. When the fuel melts during its use within a reactor, capillary and surface tension forces hold the fuel in the pores of the element.

It should be understood that by practicing the method of the invention it is possible to manufacture high temperature nuclear fuel elements in many different configurations. Some of the more preferred configurations for such high temperature fuel elements will now be described. FIG. 2 is a schematic illustration of a basic porous core component for the nuclear fuel element structure of the present invention. As shown in FIG. 2, this basic component comprises a generally spherical member 1 made of a suitable conventional, commercially available porous graphite or carbon. A plurality of irregularly shaped pores in the member 1 are formed to have a desired fuel-carrying volume, by any suitable commercially available process for manufacturing and shaping the pores in such porous graphite or carbon members. In the preferred embodiment of the invention, each of the members 1 is made to be approximately 500 microns in diameter, but it will be understood that the particular outer surface configuration of the member 1 and its size is not critical in practicing the method of the present invention. It should be noted that it is typical in such a member that some of the pores open at the surface of the member, while other pores are closed relative to exposure to the outer surface. Accordingly, the accessibility of the pores to impregnation with fissionable fuel material is often somewhat restricted by the number of open-ended pores within the members. FIG. 3 illustrates this point by showing a graphite member 1 having its pores 2 in which a suitable fissionable fuel material 3 is disposed only in those pores that open to the surface of the member. Several closed-end pores 2A are not accessible to fuel/solvent at the surface of member 2, so those pores 2A remain empty.

As noted above with respect to the description of the preferred method steps of the invention, the fissionable fuel material 3 can be stabilized and localized within the pores 2 of member 1 by heating the member 1 sufficiently to melt the fissionable material and to cause it to chemically react with the walls of the pores 2. After one or more such melting steps have been performed in order to localize the fuel within the member 1, the pores are thus made effective to hold the fuel within the pores, through resultant capillary forces and surface tensions forces with the molten fissionable fuel material and the walls of the pores.

Figure 4:
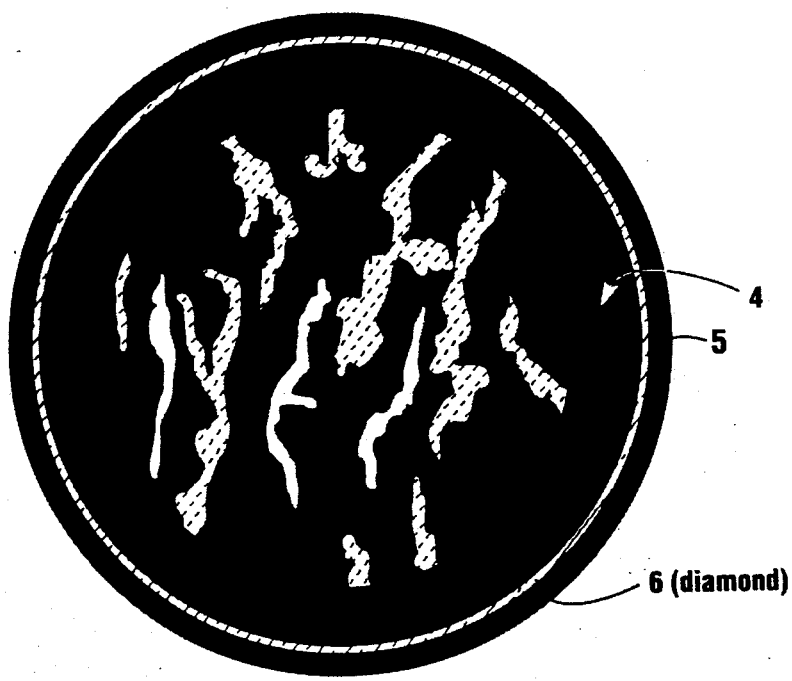
FIG. 4 is a schematic plan view, in cross section along one diameter of a high temperature nuclear fuel element such as that shown in FIG. 3, but including a pyrolytic graphite coating formed over the entire outer surface of the porous graphite fuel element, and further showing a coating of diamond formed over the outer surface of the pyrolytic graphite coating. The coatings form successive barriers against migration of molten fissionable material from the pores of the fuel element.

After a desired number of fuel-loading steps have been performed on the element 1, as discussed in greater detail relative to the method steps described above, a coating of pyrolytic carbon is formed over substantially the entire outer surface of the member 1, as is illustrated in FIG. 4. The coating of pyrolytic carbon 4 forms a kinetic barrier against migration of molten fissionable material from the pores 2; thus, the coating of pyrolytic carbon 4 is effective to further localize and stabilize the fissionable material 3 within the pores 2 of element 1. It is important to note that the coating of pyrolytic carbon 4 is not a porous pyro-carbon structure, which would permit expansion of the graphite member 1, or which would accomodate the gaseous fission products that are generated as the fissionable fuel material is consumed. Instead, the coating 4 is made of a dense, non-porous pyrolytic carbon so that it is effective to prevent the migration of molten fissionable material 3 from the pores 2.

In a modified embodiment of the new fuel element 1 of the invention, a coating of diamond 5 is deposited over the entire outer surface of the pyrolytic carbon 4 to act as a further kinetic barrier to the migration of melted fissionable material from the pores 2 and to further act as a barrier against the reaction of reactor moderating gases, such as hydrogen or helium, with the molten fissionable material 3. Another modification of the fuel element of the invention illustrated in FIG. 4 can be achieved by replacing the coating of pyrolytic carbon 4 with a coating of diamond 5 being deposited directly on the graphite member 1, so that the diamond coating 5 would directly seal the pores 2 and also serve as a barrier against reaction between the reactor moderating gases and the molten fissionable material 3 within the member 1. It has been found preferable to form the diamond coating 5 on either the outer surface of the porous graphite or carbon member 1 or on the coating of pyrolytic carbon 4, by use of a conventional controlled vapor deposition process in which hydrogen is present in a concentration greater than about 95% of the gas ambient for the deposited diamond film during the vapor deposition step. That concentration of hydrogen is effective to minimize the presence of graphite in the deposited diamond coating 5. It has also been found that the nuclear fuel element configuration illustrated in FIG. 4 can be further modified by depositing a layer of porous graphite carbon over the entire outer surface of the coating of pyrolytic carbon 4, between it and the diamond coating 5. A portion (only) of such a layer of a porous graphite carbon 6 is illustrated in FIG. 4. By using such alternate layers of different forms of carbon, the successive layers are made more effective to form a series of kinetic barriers to further localize and stabilize molten fissionable material 3 within the pores 2.

In the preferred embodiment of the nuclear fuel element structure illustrated in FIG. 4, the fissionable material 3 comprises a composition of uranium or plutonium carbide or nitrate and the porous graphite member 1 is either selected or suitably modified by the oxidation steps of the method of the invention to assure that at least some of the pores do extend to the outer, generally spherical surface of the member 1 and are greater in length than a radius of member 1, as is clearly illustrated in FIG. 4. The thicknesses of the respective coatings 4 and 5 illustrated in FIG. 4 must be effective to form barriers against migration of the fissionable fuel material from the pores 2, and the outer diamond coating 6 must be effective to shield the fissionable material from the reactor moderating gases; thus, each of the coatings 4 and 5 should be made at least 25 microns thick, up to about 25 mils thick, measured in a radial direction. The diamond coating 6 is preferably made 25 microns to 5 mils thick.

Figure 5:
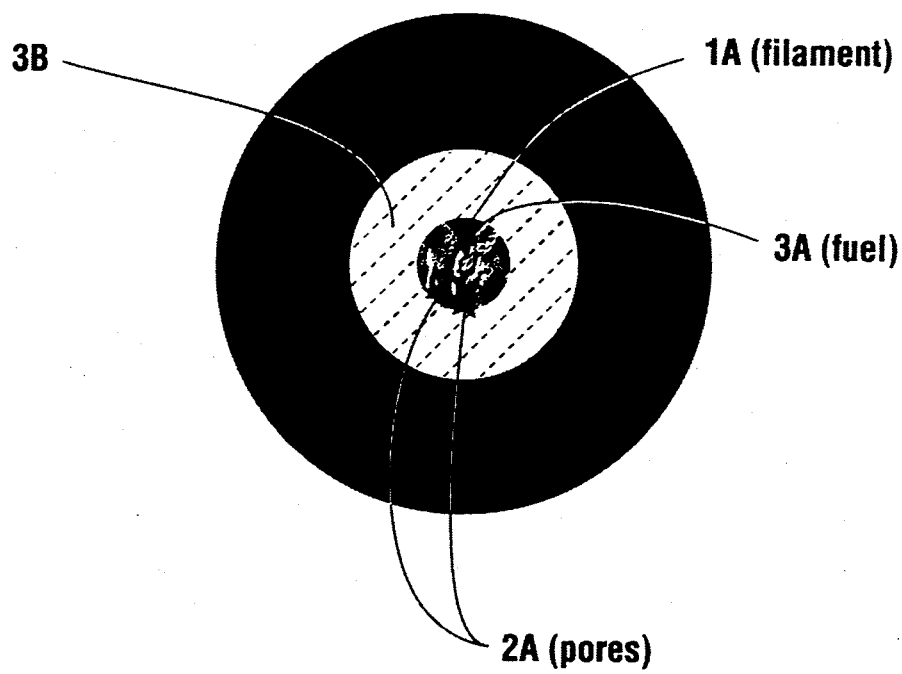
FIG. 5 is a schematic plan view in cross section along one transverse diameter of a high temperature nuclear fuel, flexible filament element that is constructed according to the present invention to have porous graphite pores within which a fissionable nuclear material is reacted to form a carbide fuel layer surrounding the element, and further illustrating an outer coating of either unreacted pyrolytic graphite or diamond that is effective to prevent migration of molten fissionable material from the fuel element.

Another preferred configuration of nuclear fuel element made according to the invention is one in which the fuel elements are made as relatively thin filaments or fibers that are capable of performing at temperatures up to the sublimation temperatures of graphite, i.e. at temperatures greater than 3300° C. Suitable carbon filaments or fibers for practicing this form of the invention are commercially available in both porous and solid graphite filament form. There is illustrated in FIG. 5, in transverse cross section along a diameter of such a porous carbon or graphite filament member 1A a generally circular (or cylindrical) configuration for the filament, but it will be recognized that such filaments may have other cross section configurations without departing from the scope of the present invention. A plurality of pores 2A that extend into the filament 1A from its outer surface are filled with fissionable material 3A in a manner similar to that used for filling the pores 2 of the generally spherically carbon or graphite fuel elements illustrated in FIGS. 3–4. In addition to the fissionable material that is localized within the pores 2A, a layer of fissionable material 3B is deposited around the graphite or carbon filament element 1A.

In practicing the method of the invention to make such a filament type fuel element it has been found that a carbon filament can be suitably heated by passing electric current through it, after it is suitably electrically connected between conventional commercially available terminals, which in turn are operatively connected to a conventional source of electric power. The graphite filaments can thus be either partially or totally converted to a nuclear fuel element by controlling the current, time and pressure of an ambient gas or vapor environment of a suitable fissionable material such as uranium hexalflouride, which is made to surround the filament during the fuel impregnation step. By thus suitably controlling the heat transfer geometry within such a conventional furnace, uranium or other suitable fissionable material is deposited within the pores 2A and if desired the deposition is continued to build up a surrounding coating 3B of fissionable material, as illustrated in FIG. 5. By controlling current passed through the filament thereby to regulate the temperature of the graphite filament 1A, the fissionable material 3A within the pores 2A is melted sufficiently to cause it to react with the graphite walls defining the pores 2A, thereby to localize and stabilize the molten material within the pores. After that reaction, the gas used to deposit the fissionable fuel material in and around the graphite film element 1A is removed as an ambient for the filament and appropriate alternative gases are used to deposit either pyrolytic carbon or diamond, such as the coating layer 4A illustrated in FIG. 5.

Figure 6:
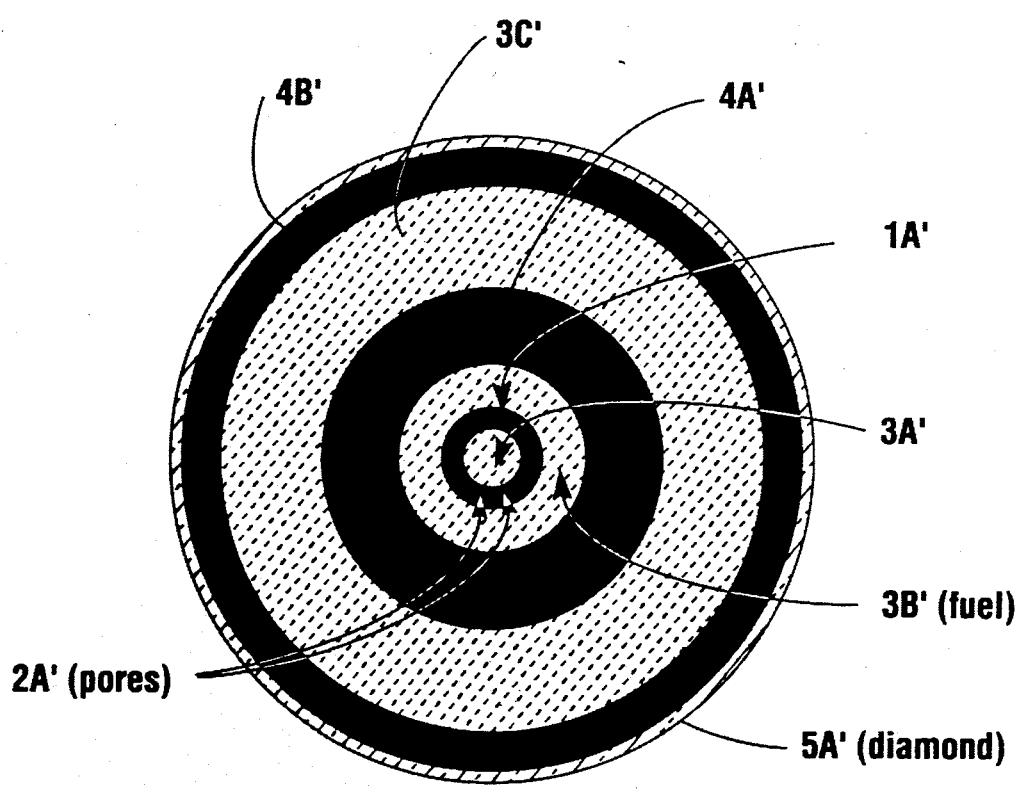
FIG. 6 is a schematic diagram plan view, in cross section along a transverse diameter of a high temperature nuclear fuel, filament element comprising alternate layers of fissionable nuclear fuel; starting with such fissionable material at the central core of the filament, and including successive coatings of pyrolytic carbon or diamond, which coatings are effective to prevent migration of melted fissionable material from the fuel element, when the element is heated during use.

As was the case with the type of nuclear fuel element illustrated in FIGS. 3–4, a multiple-layer fuel element can be made in a filament configuration, as is shown in FIG. 6. In FIG. 6, a hollow porous carbon or graphite member 1A' having pores 2A' therein is impregnated with a suitable fissionable material 3A' and is surrounded by additional fissionable material 3B' that is coated on both the interior and exterior surfaces of the member 1A'. By suitably raising and lowering the temperature of the filament 1A', for example by selectively regulating the electric current that is passed through it, and by changing the gas composition and the pressure of the furnace ambient surrounding the filament during such heating, predetermined and controlled layers of graphite, pyrolytic carbon, and diamond can be formed on the filament, generally in the manner noted above. Thus, as is shown in FIG. 6, the fissionable fuel coating 3B' on the filament 1A' is coated with a layer of pyrolytic carbon 4A', which in turn is surrounded by another layer of fissionable fuel material 3C', which in turn is coated with another layer of pyrolytic carbon 4B' which acts as a kinetic barrier against migration of the fissionable material 3C' through the pyrolytic carbon coating 4B' according to the present invention. It should understood that although only a portion of a diamond coating 5A' is illustrated, this coating is formed to completely surround the outer surface of the pyrolytic carbon layer 4B', thereby to form a kinetic barrier against migration of fissionable fuel material from the fuel element, and also to form a barrier between the moderating hydrogen or helium gas used in a high temperature gas reactor, and the fissionable fuel material within the fuel element.

Figure 7:
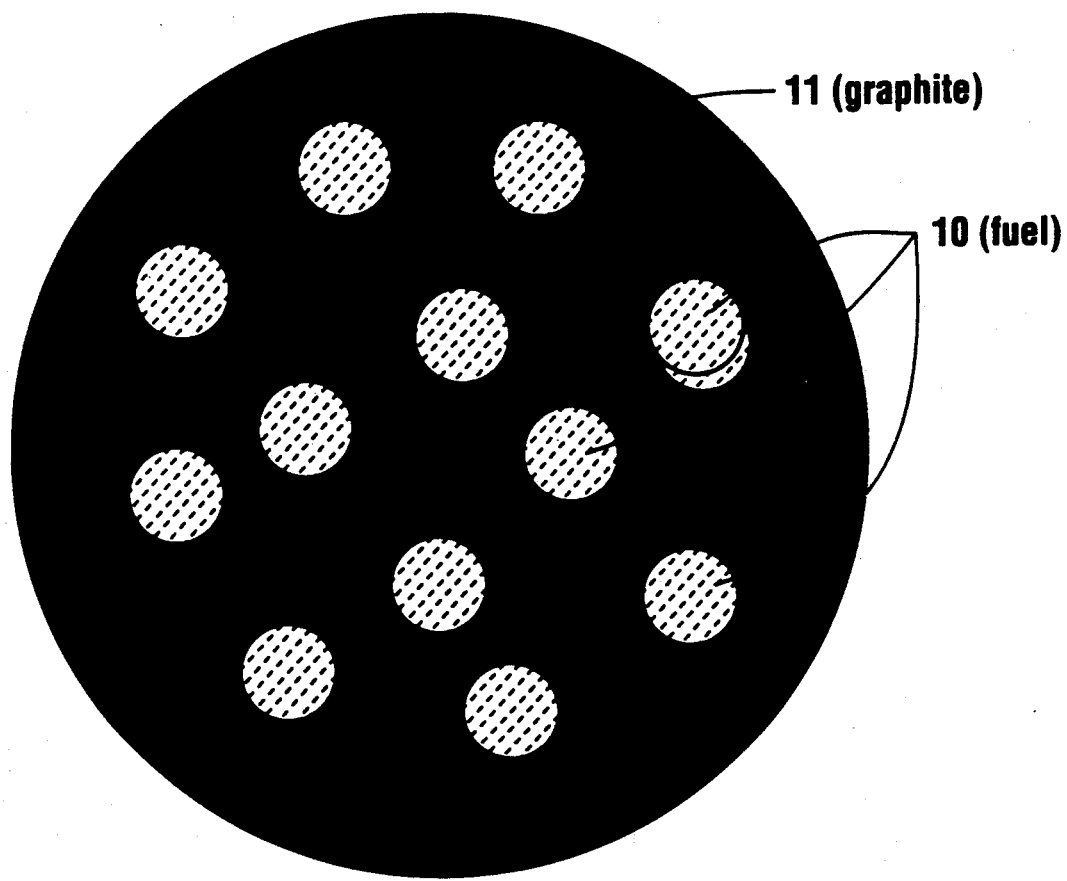
FIG. 7 is a schematic diagram plan view, in cross section along a transverse diameter of a high temperature nuclear fuel element that includes a plurality of fissionable material fuel filaments that are reacted with the walls of surrounding pores through a graphite housing element to localize and stabilize the fissionable material within the pores of the element by surface tension and capillary forces between the fuel material and the graphite walls of the pores.

One advantage of the filament type fuel element illustrated in FIGS. 5 and 6 is that they are sufficiently flexible to enable the individual filaments to be twisted to form a thicker bundle of such elements, which in turn can be deposited in a graphite housing. For example, as is shown in FIG. 7, a plurality of such fissionable fuel elements 10 are schematically shown surrounded by a body of graphite 11, which preferably is pyrolytic carbon that forms yet another barrier against migration of the fissionable material from the elements 10. Of course, the cross section configuration of individual fuel element 10 can be made of any desired multiple layer configuration, such as the configurations shown in FIGS. 5 and 6.

Figure 8:
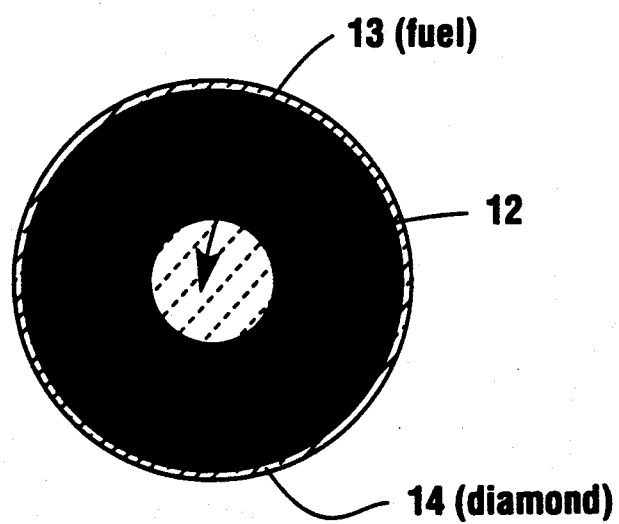
FIG. 8 is a schematic diagram plan view, in cross section along a transverse diameter of a high temperature nuclear fuel filament element, somewhat similar to the type of filament shown in FIG. 5, but including a coating of diamond surrounding the graphite coating to form a kinetic barrier against migration of molten fissionable material from the pores of the graphite, and to further form a barrier that protects the fissionable material from reaction with moderating gases such as hydrogen or helium within a high temperature gas reactor.

A desirable feature of such a multi-filament fuel element is that it permits a number of different fissionable fuel materials to be used in selected combinations within a single multi-fuel element such as the graphite cylinder 11 illustrated in FIG. 7. It should be understood that, according to the present invention, the fissionable fuel materials used in making a multi-fuel element bundle, such as that shown in FIG. 7, can be stabilized and localized within the fuel member 11 by heating it to melt the fissionable material and cause is to react with the graphite that surrounds the fissionable material, thereby to help prevent the fissionable material from migrating out of the fuel element. As noted above, a diamond coating could be provided over the exterior surface of the element 11 to form a further barrier against migration of fissionable fuel material from the combined fuel element 11, as well as to prevent the fissionable material from reacting with the reactor gases. To illustrate such a modification a simpler form of flexible fuel filament is shown in FIG. 8. In this modification a hollow porous graphite filament 12 has a fissionable fuel material 13 impregnated within its pores (not shown) and built up on its inner cylindrical surface. A diamond coating 14 is formed by a conventional vapor deposition process over the outer surface of the filament 12. Referring, again to FIG. 7, it should also be noted that when a plurality of such filaments 10 are positioned adjacent to one another to form a true element bundle, i.e. without added graphite of the member 11 between the filaments (10) as shown in FIG. 7, the juxtaposed surfaces of the respective filaments 10 provide additional surface barriers that further serve to localize and stabilize molten fissionable fuel materials within the respective filaments 10. It will be appreciated that a bundle of filament, fuel-containing elements 10, such as those shown in FIG. 7, may be formed by either twisting individual filaments 10 together, or by pressing a body of graphite material, such as the material 11, around individual filaments to form a larger cylindrical multi-filament fuel element of the type shown in FIG. 7. Alternatively, a body of graphite (11) could be bored to form passageways for accepting the fuel filaments (10).

From the foregoing description of the invention it will be apparent to those skilled in the art that various further modifications and alternative embodiments of it may be developed without departing from the scope of the invention; thus, it is my intention to encompass within the following claims the true limits of the invention.

I claim:

1. A nuclear fuel element containing fissionable material for use in a high temperature gas reactor having an operating temperature that is higher than 2000° C. and that is higher than the melting point temperature of said fissionable material, comprising, a graphite or carbon member having a plurality of pores therein, a fissionable fuel material disposed within said pores, said pores being effective through capillary forces and surface tension forces with the fissionable fuel material when it is molten liquid to retain and localize said molten liquid material within the pores, and a coating of pyrolytic carbon over substantially the entire outer surface of said member to form a kinetic barrier against melted liquid fissionable material migration, thereby to further localize and stabilize the fissionable material within said pores.

2. An invention as defined in claim 1 wherein the coating of pyrolytic carbon is replaced by a coating of diamond which acts as a kinetic barrier against melted fissionable fuel material migration and further acts as a barrier against reactor moderating gases, such as hydrogen or helium, when the fuel element is exposed to such gases, said latter barrier thus being effective to protect the molten fissionable fuel material from reaction with said moderating gases.

3. An invention as defined in claim 2 wherein said coating of diamond is formed on the outer surface of the porous graphite or carbon member by a controlled vapor deposition process in which hydrogen is present in a concentration greater than 95% of the gas ambient for the deposited film during the vapor deposition step, thereby to minimize the presence of graphite in the deposited diamond coating.

4. An invention is defined in claim 1 including a layer of graphite or carbon deposited over the entire outer surface of said coating of pyrolytic carbon, thereby to provide alternate layers of porous graphite or carbon and pyrolytic carbon, said alternate layers being effective successive kinetic barriers to further localize and stabilize molten fissionable material within said pores.

5. An invention as defined in claim 4 including a diamond coating formed over the entire outer surface of the outermost layer of graphite or carbon to act as a kinetic barrier to both melted fuel migration and reaction of molten fissionable fuel material with reactor moderating gases.

6. An invention as defined in claim 1 wherein said porous graphite or carbon member is generally spherical in configuration and wherein at least some of said pores open to the spherical surface and are greater in length than a radius of the generally spherical configurations of the carbon or graphite member.

7. An invention as defined in claim 1 wherein said fissionable material comprises a composition of uranium, or plutonium carbide.

8. An invention as defined in claim 4 wherein said alternate layers are each between 25 microns and 25 mils thick.

9. An invention as defined in claim 8 wherein said diamond layer is at least 25 microns thick and is in the range of 25 microns to five mils thick.

10. An invention as defined in claim 1 wherein said porous carbon or graphite member comprises an elongated filament.

11. An invention as defined in claim 5 wherein said porous or graphite member comprises a flexible filament.

12. An invention as defined in claim 10 wherein a plurality of said filaments are positioned adjacent to one another to form a bundle, with the juxtaposed surfaces of the filaments providing additional surface barriers that further localize and stabilize molten fissionable fuel material within the respective filaments.

13. An invention as defined in claim 12 wherein said bundle of filaments is encased within a cylinder of pressed graphite particles.

14. An invention as defined in claim 13 wherein at least some of said filaments differ from one another in their types of fissionable fuel material content.

15. An invention as defined in claim 12 wherein each of said filaments is flexible and is adapted to be twisted about another filament to form a bundle of filaments.

16. A method for making a nuclear fuel element for a high temperature gas moderated reactor that has a normal operating temperature of 2000° C., or more, comprising the steps of;
   a) providing a plurality of porous graphite or carbon members that are adapted to have fissionable material impregnated in the pores thereof,
   b) impregnating fissionable fuel material within said pores,
   c) heating said members to cause the fissionable material to melt and react with the carbon wall of said pores, thereby to localize and stabilize the fissionable fuel material within the pores, and
   d) forming a layer of pyrolytic carbon over the outer surface of said members, thereby to seal the pores and to form a barrier against migration of the melted fissionable material from the pores.

17. A method as defined in claim 16 including the step of forming a layer of diamond over the layer of pyrolytic carbon, thereby to provide a further barrier against migration of the fissionable material from the pores and to form a barrier that prevents the fissionable material from being exposed to moderating gases of an associated gas-moderated reactor, when the fuel elements are used in such a reactor.

18. A method as defined in claim 16 including the step of providing said carbon or graphite members in the form of flexible filaments.

19. A method as defined in claim 17 including the step of forming said diamond layer by using a vapor deposition process in which an ambient gas having a concentration of at least 95% hydrogen is provided over the deposited layer during the deposition process.

20. A method for making a nuclear fuel element for a high temperature gas-moderated reactor that has a normal operating temperature of 2000° C., or more, comprising the steps:
   a) providing a plurality of porous graphite or carbon members that are adapted to have fissionable fuel material impregnated therein,
   b) impregnating said members with oxidant and heating the members to increase their porosity by causing a controlled reaction with the oxidant,
   c) impregnating said members with a solution of fissionable fuel material and solvent and evaporating the solvent to leave fissionable fuel material deposited in pores of the graphite members,
   d) heating said members to react the fissionable material with the graphite members and to increase porosity of the graphite members,
   e) re-impregnating said members (one or more times) with a solution of fissionable fuel material and solvent and evaporating the solvent,
   f) coating the graphite members with a layer of pyrolytic carbon (or diamond) to further localize the fissionable material within the pores, and
   g) depositing one or more additional layers of pyrolytic carbon or diamond on the outer surface of the graphite or carbon members or on the earlier-applied coatings thereon.

* * * * *